United States Patent
Saue (10) Patent No.: US 11,700,838 B2
(45) Date of Patent: Jul. 18, 2023

(54) DEVICE, SYSTEM AND METHOD FOR TRAPPING AND KILLING MARINE ORGANISMS

(71) Applicant: Brage Innovation AS, Bønes (NO)

(72) Inventor: Vidar Saue, Bønes (NO)

(73) Assignee: Brage Innovation AS, Bønes (NO)

(*) Notice: Subject to any disclaimer, the term of this patent is extended or adjusted under 35 U.S.C. 154(b) by 514 days.

(21) Appl. No.: 16/338,092

(22) PCT Filed: Sep. 25, 2017

(86) PCT No.: PCT/NO2017/050242
§ 371 (c)(1),
(2) Date: Mar. 29, 2019

(87) PCT Pub. No.: WO2018/062999
PCT Pub. Date: Apr. 5, 2018

(65) Prior Publication Data
US 2020/0022340 A1 Jan. 23, 2020

(30) Foreign Application Priority Data
Sep. 29, 2016 (NO) .................................. 20161570

(51) Int. Cl.
*A01K 61/13* (2017.01)
*A01M 1/04* (2006.01)
*A01M 1/22* (2006.01)

(52) U.S. Cl.
CPC ............... *A01K 61/13* (2017.01); *A01M 1/04* (2013.01); *A01M 1/223* (2013.01)

(58) Field of Classification Search
CPC ........ A01K 61/13; A01K 61/10; A01K 61/60; A01K 63/04; A01M 1/04; A01M 1/20
(Continued)

(56) References Cited

U.S. PATENT DOCUMENTS 2,709,984 A * 6/1955 Marks ..................... E02B 1/003
                                              119/220
9,072,281 B2 * 7/2015 Beck ....................... A01K 61/95
(Continued)

FOREIGN PATENT DOCUMENTS

EP   3103771 A1    12/2016
EP   3103771 A4 *  2/2017  ............. A61L 2/035
(Continued)

OTHER PUBLICATIONS

Daiso Engineering Co. Ltd., https://www.daisoeng.co.jp/english/buisiness/electrode/use.html#2; [hentet fra internett Oct. 2, 2016].
(Continued)

*Primary Examiner* — Tien Q Dinh
*Assistant Examiner* — Kevin M Dennis
(74) *Attorney, Agent, or Firm* — Knobbe, Martens, Olson & Bear, LLP (57) ABSTRACT

A device (10) for trapping and killing marine organisms (14) such as animal plankton, salmon lice and other parasites, comprises a body (12; 12') configured for submersion in water (15). The body (12; 12') comprises at least one light source (16) configured and controlled for attracting said marine organisms, and an internal cavity (20) having an opening (20') for fluid communication with at least a portion of the water. The light sources (16) are arranged inside the cavity (20) and arranged and controlled to emit light waves through said opening and into at least a portion of the water. At least one positive electrode (24; 24'; 24"; 32) is arranged in the cavity and electrically connected to a low-voltage power source (26; 27; 30), and at least one negative electrode (15a) is arranged in the water and electrically connected to said power source (26; 27; 30). The invented device generates, by means of electrolysis with the water (15), chlorine gas (21) at or in a region near the at least one
(Continued)

positive electrode, and the chlorine gas (21) reacts with water inside the cavity to form hypochloric acid and hydrochloric acid (31).

28 Claims, 6 Drawing Sheets

(58) Field of Classification Search
USPC .................................................. 119/215, 231
See application file for complete search history.

(56) References Cited

U.S. PATENT DOCUMENTS

| | | | |
|---|---|---|---|
| 10,035,717 B2 * | 7/2018 | Yamamoto | B63J 4/002 |
| 10,537,094 B2 * | 1/2020 | Kijima | A01K 63/006 |
| 2008/0277274 A1 * | 11/2008 | Kim | C02F 1/4674 |
| | | | 204/275.1 |
| 2013/0050465 A1 * | 2/2013 | Beck | A01K 61/10 |
| | | | 348/81 |
| 2016/0278348 A1 * | 9/2016 | Sukegawa | A01K 63/04 |
| 2016/0340213 A1 * | 11/2016 | Yamamoto | C02F 1/4674 |
| 2019/0216060 A1 * | 7/2019 | Kijima | C02F 1/34 |

FOREIGN PATENT DOCUMENTS

| | | | | |
|---|---|---|---|---|
| GB | 2286756 A | | 8/1995 | |
| JP | H06153744 | * | 6/1994 | ............ A01K 63/04 |
| JP | H06153744 A | | 6/1994 | |
| JP | 3740562 B2 | | 12/1997 | |
| JP | H9-308886 A | | 12/1997 | |
| JP | 2011/229405 A | | 11/2011 | |
| WO | 2011/135384 A1 | | 11/2011 | |
| WO | 2015/009160 A1 | | 1/2015 | |
| WO | WO-2015009160 A1 | * | 1/2015 | ............ A01K 75/02 |
| WO | 2015/118584 A1 | | 8/2015 | |

OTHER PUBLICATIONS

Hsu, G.S.W. et al., Effects of electrode settings on chlorine generation efficiency of electrolyzing seawater, Journal of food and drug analysis, 2015, vol. 23, side 729-734.

Flamarique, I.N. et al., Monitoring and potential control of sea lice using an LED-base light trap, Can. J. Fish. Aquat. Sci. 2008, vol. 66, side 1371-1382.

International Search Report for PCT Application No. PCT/NO2017/050242, dated Feb. 22, 2018, in 4 pages.

Norwegian Search Report for Application No. 20161570, dated Feb. 28, 2017, in 2 pages.

Norwegian Search Report issued for Norwegian Patent Application No. 20190531, dated Nov. 22, 2021 in 2 pages.

Canadian Office Action issued in the corresponding Canadian Patent Application No. 3,038,644, dated May 17, 2023 in 4 pages.

* cited by examiner

DEVICE, SYSTEM AND METHOD FOR TRAPPING AND KILLING MARINE ORGANISMS

CROSS-REFERENCE TO RELATED APPLICATIONS

This application is the U.S. National Phase under 35. U.S.C. § 371 of International Application PCT/NO2017/050242, filed Sep. 25, 2017, which claims priority to Norwegian Patent Application No. 20161570, filed Sep. 29, 2016. The disclosures of the above-described applications are hereby incorporated by reference in their entirety.

FIELD OF THE INVENTION

The present invention relates to a device, an assembly, a system and a method for killing marine organisms, as specified in the preamble of claims 1, 10, 12 and 22, respectively.

BACKGROUND OF THE INVENTION

Ever since the beginning of salmon farming and other fishfarming in plants floating in the sea, the problems associated with the parasite salmon lice have presented a considerable problem for the fish health and the environment in general. Today's remedies are based on chemical compositions that are not sustainable and furthermore are costly and place great burdens on the fish farmers. In addition, they present a threat to indigenous fishes, such as salmon and sea trout. The salmon lice is a parasite which attaches itself to the fish and inflicts considerable damage on, and suffering for, the fish. By virtue of the large quantities of salmon lice on the fish, the fishfarming plants are veritable "producers" of billions of salmon lice that are released into the ocean.

A number of methods for removing parasites from the fish have been tested: for example immersing the fish in chemicals, and spraying the fish with high-pressure jets. These methods have not been very successful and, more importantly, are considered to cause pain to the fish.

The salmon lice has a behavioral pattern in relation to light waves which the present invention seeks to exploit in order to kill the salmon lice such that it does not attaches itself to the fish.

The prior art includes WO 2015/009160 A1, which describes a device for weakening or killing parasites, such as salmon lice. The device comprises a body arranged to be lowered into water and being furnished with lights to attract the parasites. The body comprises an outer, electric current-conducting surface connected to a high-voltage module arranged in the body, and the module is configured to transmit electric pulses at a voltage that kills or weakens parasites. The lights are preferably light-emitting diodes (LED lights) arranged in respective openings having a conical or concave surface, a parabolic shape or the like. In one embodiment, the LED lights are configured to emit light wavelengths between 450 and 570 nm, which is particularly suitable for attracting copepodites and salmon lice.

The prior art also includes NO 331345 B1, GB 2286756 A, NO 327350 B1 and NO 313931 B1.

NO 331345 B1 discloses the use of a device for tracking the lice by means of an optical system, and then a laser is triggered to fire laser pulses to kill the lice when it is on the fish.

Attraction of lice by means of light is also known from GB 2286756A, which describes a salmon lice trap which emits light and illuminates a volume of water. The light attracts salmon lice which crowds together and is trapped in the trap. The salmon lice is killed either by exposure to rays, crushing, or similar methods, and is subsequently removed from the trap.

It is an object of the invention to provide a device and a system for attracting parasites in water, such as harmful animal plankton, salmon lice, etc., and then kill these harmful parasites.

SUMMARY OF THE INVENTION

The invention is set forth and characterized in the main claims, while the dependent claims describe other characteristics of the invention.

It is thus provided a device for trapping and killing marine organisms such as animal plankton, salmon lice and other parasites, comprising a body configured for submersion in water, and wherein the body comprises at least one light source configured and controlled for attracting said marine organisms, characterized in that the body comprises a cavity arranged inside the body and having an opening for fluid communication with at least a portion of the water;

said at least one light source is arranged inside the cavity and arranged and controlled to emit light waves through said opening and into at least a portion of the water;

at least one positive electrode arranged in said cavity and configured for being electrically connected to a low-voltage power source;

at least one negative electrode arranged in the water and configured for being electrically connected to said power source;

whereby the device is operable to, by means of electrolysis with the water, generate chlorine gas at or in a region near the at least one positive electrode, and wherein the chlorine gas reacts with water inside the cavity to form acid inside said cavity.

In one embodiment, the at least one positive electrode comprises an electrically conductive plate member or an electrically conductive material arranged on at least a portion of an inner wall of said cavity. In one embodiment, the at least one positive electrode comprises one or more anodes connected to the body and extending into said cavity. In one embodiment, at least one anode comprises a graphite material or a carbon material. In one embodiment, the device further comprises an electronics module for controlling and operating said at least one light source and said at least one positive electrode.

The said at least one light source may comprise a light-emitting diode (LED) and said light waves may be in the range between 450 and 570 nm. In one embodiment, a sensor is arranged in said cavity and configured for sensing environmental parameters inside the cavity. The acid may comprise at least hypochloric acid. The at least one negative electrode may be arranged on or in the vicinity of the device.

It is also provided an assembly for trapping and killing marine organisms such as animal plankton, salmon lice and other parasites, characterized by a plurality of devices according to the invention, interconnected by a common power and control cable. Said plurality of devices may be arranged in a string, one device after another, and the cable may extend through the devices.

It is also provided a system for decimating marine organisms such as animal plankton, salmon lice and other parasites, characterized by a plurality of devices according to the invention, suspended in the water to form a barrier of devices; wherein the devices are connected to a control system.

In one embodiment, the plurality of devices form at least one assembly according to the invention.

In one embodiment, the system according to the invention comprises at least one sensor arranged in the water in the vicinity of at least one of said plurality of devices and is configured for sensing environmental parameters in the water. In the system, the devices may be placed around a farming plant for farming fish or other marine animals. In one embodiment, the device is connected to an external control unit, configured for controlling and receiving signals from an electronics module in the body or on the body.

The control unit may be connected to a number of sensors for sensing of one or more of current/voltage, conductivity, temperature, depth, light measurement and water current, in or around the body. The control unit may be connected to an alarm.

In one embodiment, the system comprises at least one low-voltage power source. The power source may be a direct-current power source, or the control unit may comprise conversion means for converting an alternating current to a direct current. In one embodiment, the system comprises a common negative electrode extending into the body of water.

It is also provided a method of trapping and killing marine organisms such as animal plankton, salmon lice and other parasites, characterized by:
a) submerging at least one body in water, said body comprising an internal cavity having an opening for fluid communication with at least a portion of the water;
b) emitting light from inside the cavity and out into the water through the opening, said light having a wavelength suitable for attracting one or more of said marine organisms;
c) forming chlorine gas inside the cavity by electrolysis with water inside the cavity, and allow said chlorine gas to react with water inside the cavity to form at least hypochloric acid inside said cavity. The electrolysis may be effected by application of a low-voltage current to a positive electrode inside said cavity. Following step c), the application of said low-voltage current may be halted until a predetermined quantity of said acid has dissolved in the water. Acid content inside said cavity may be sensed by a sensor, and the above-mentioned halting of low-voltage application may be based on information provided by said sensor. The water may be seawater.

The present invention thus concerns a system and a device for killing marine organisms, such as animal plankton or parasites (e.g. salmon lice), wherein the device comprises a body configured for immersion in water, and wherein the body is furnished with at least one internal cavity; said cavity comprising lights for attracting said organisms and means for generating chlorine gas by electrolysis (using said water (preferably seawater) as an electrolyte), whereby acid is formed in the cavity when the chlorine gas reacts with the water in which the device is submerged.

The present invention has been developed as a preventive means to kill or neutralize the parasite before it attaches itself to the fish.

The invention provides a technical device and catch trap for attracting and killing harmful species of animal plankton, e.g. salmon lice, by attracting salmon lice by light having certain wavelengths and frequencies and then kill the parasites by production of small quantities of chlorine gas by electrolysis, which in turn reacts with the seawater and forms hydrochloric acid as well as hypochlorous acid in small pockets/traps around the light source inside the device, which in turn kills animal plankton/salmon lice.

Chloride-ions in seawater oxidizes to chlorine gas according to the following reaction:

$$2Cl^- \Rightarrow Cl_2(g) + 2e^-.$$

Chlorine gas dissolves immediately in the seawater. Dissolved chlorine reacts quickly with the water such that hypochlorite ($OC^-$) and chloride ions ($Cl^-$) are formed. Hypochlorite is strongly oxidizing and reacts with oxidizable material that may be present, such as organisms og organic material in the seawater. Test results with e.g. salmon lice copepodites, show that these die immediately in such an environment.

The light wavelengths may be emitted in a conical beam downwards in the water column and will lure animal plankton/salmon lice into the device and then kill animal plankton/salmon lice inside the device trap by production of chlorine gas and acid formation.

The device according to the invention contains an insulated electric conductor which extends a certain length down into the sea with one or more devices after one another, but with a distance which provides sufficient time to enter the device without being carried off by the water currents. The number of devices per string depends on the depth at which the salmon lice is found. Available data suggest that copepodites live in free water at depths between 0 and approximately 10 meters. The device may be connected to other devices in an overlapping distance with respect to each other, such that the distance is such that salmon lice are attracted by the light waves from the body and chlorine gas/acid formation decimates the salmon lice when it is collected inside the bodies in pockets/traps around the light source.

The devices may form a grid pattern in the sea to kill animal plankton/salmon lice horizontally and vertically in the sea.

The devices may be suspended as barriers or fences around or along the fish farming plant with an overlapping of devices that attract animal plankton/salmon lice with light wavelengths, and produce chlorine gas/form acid to kill animal plankton/salmon lice which is carried by the currents past these devices/traps.

These devices/traps may be deployed perpendicularly to the currents on both sides of the plants or surround the entire plant. The fences or barriers may also be deployed in strategic locations to prevent infestation og salmon lice on indigenous salmon and sea trout.

Several test have been performed in a test pool with the devices according to the invention, and these show that copepodites/salmon lice are attracted by light waves having wavelengths of between 450-570 nm. It has also been documented that the salmon lice are attracted to certain wavelengths of light, such that by emitting such wavelengths from the bodies, animal plankton/salmon lice are drawn into the bottom of the device which is hollow and produce chlorine gas and generate acid which in turn form a trap/pocket of chlorine gas and acid which in turn decimates the animal plankton/salmon lice.

The devices may be made from a variety of materials, e.g. plastic, metal or other materials, and may be made in any number of shapes.

The above mentioned purposes are achieved by a device for neutralizing parasites, such as salmon lice, comprising a body configured for submersion in water, and wherein the body is provided with lights for attracting said parasites, characterized in that the body comprises an internal cavity in the body which produces and collects small amounts of chlorine gas and formed of acid in traps/pockets around the light source which in turn decimates salmon lice, parasites.

The body may have any possible shapes, such as e.g. a cylindrical shape or a spherical shape with cavities with light sources, and be configured for producing small amounts of chlorine gas/formation of acid around the light source inside the body/trap.

The body may be supplied with a primary voltage in the form of low voltage via a cable, and where the inner surface of the light source is made in an electrically conducting material which remains positively charged towards the seawater, and where the seawater is the electrolyte. This electrically conducting material will, with applied direct current (e.g. in pulses), form chlorine gas/form acid inside the body. The surface of this material is formed with pockets around the light source for collecting the formed gas, which in turn lead the parasites directly into a toxic environment which kills these. The electrically conducting material will be sacrificed electrolytically over time, but is replaceable.

The outer shape and body may for example be shaped as a cylinder which is open in the bottom and will collect all chlorine gas/formed acid inside the device. The gas will rise and accumulate in the top, internally in the device, wherefrom the light-wavelengths emit and form a toxic and lethal environment for animal plankton/salmon lice that seek towards the light source.

The device may be composed of e.g. two halves or be cast as one body.

Several lights, such as LED lights, may be arranged in the body and beam light-wavelengths downwards and out of the device to lure animal plankton/salmon lice up to the toxic environment inside the device which in turn kills the animal plankton/salmon lice.

The apertures (openings) may be such arranged below the body that the light radiates out at a conical angle, e.g. 90 degrees into the sea, and wherein the light beams from each aperture overlaps an adjacent device.

The apertures may have a conical surface which in turn collect chlorine gas/acid formation in these pockets. Furthermore, the light may be emitted at wavelengths between 450-570 nm.

The above purpose is achieved also with a system for decimating parasites, such as salmon lice, wherein several devices as mentioned are suspended by a number of cables extending down into the water, for formation of a barrier or fence, and which is arranged with several small bodies in a dense grid which kill the parasites when these drift by with the ocean current and are lured into the chlorine traps. These barriers or fences may be arranged perpendicularly to the water current around the fish farming plants.

The chlorine gas traps or barrier may be placed around a plant for farming of e.g. fish or other marine organisms. Alternatively, the devices or barrier or devices may be placed on designated water current sides of a plant for farming of e.g. fish or other marine organisms to kill animal plankton/salmon lice or parasites before they enter the plant.

The devices may be connected to an external control unit, configured for controlling the production of chlorine gas/acid formation inside the units/traps.

The control unit may be connected to a number of sensors for monitoring of one or more of: current/voltage, earth fault surveillance, CTD, chlorine gas/acid level. The control unit may furthermore be connected to an alarm.

BRIEF DESCRIPTION OF THE DRAWINGS

These and other characteristics of the invention will become clear from the following description of embodiments of the invention, given as non-restrictive examples, with reference to the attached schematic drawings, wherein:

FIG. 4b is an enlargement of the area marked "A" in FIG. 4a;

DETAILED DESCRIPTION OF A PREFERENTIAL EMBODIMENT

The following description may use terms such as "horizontal", "vertical", "lateral", "back and forth", "up and down", "upper", "lower", "inner", "outer", "forward", "rear", "top", "bottom", etc. These terms generally refer to the views and orientations as shown in the drawings and that are associated with a normal use of the invention. The terms are used for the reader's convenience only and shall not be limiting.

Figure 1:
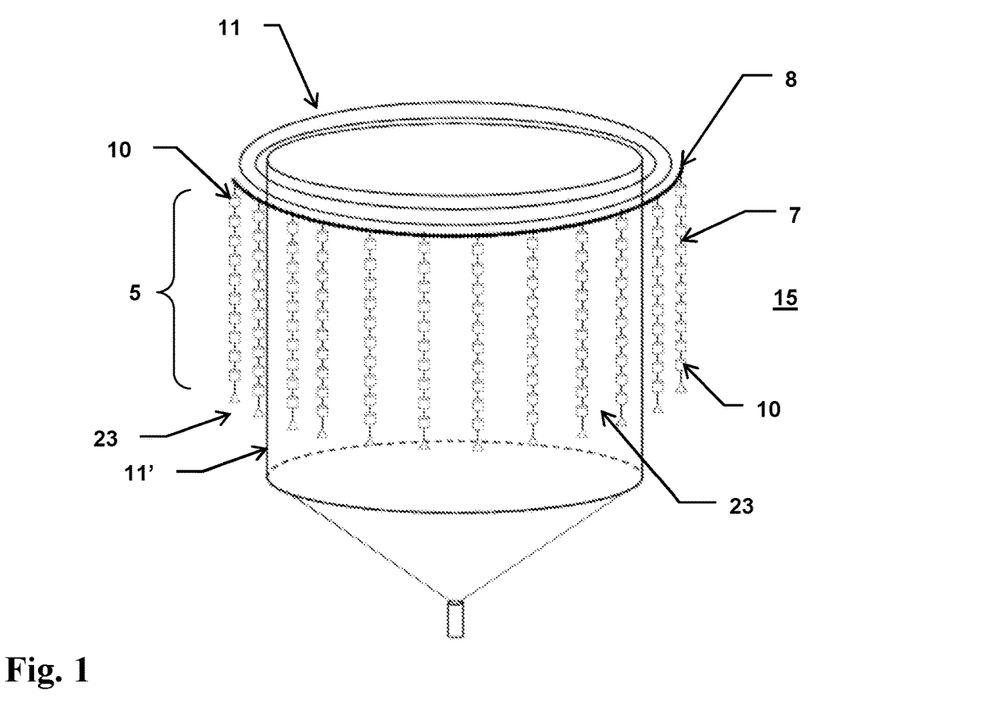
FIGS. 1 and 2 are sketches of a plurality of devices according to the invention arranged in barrier and fence around a plant, such as a fishfarming plant.
Figure 2:
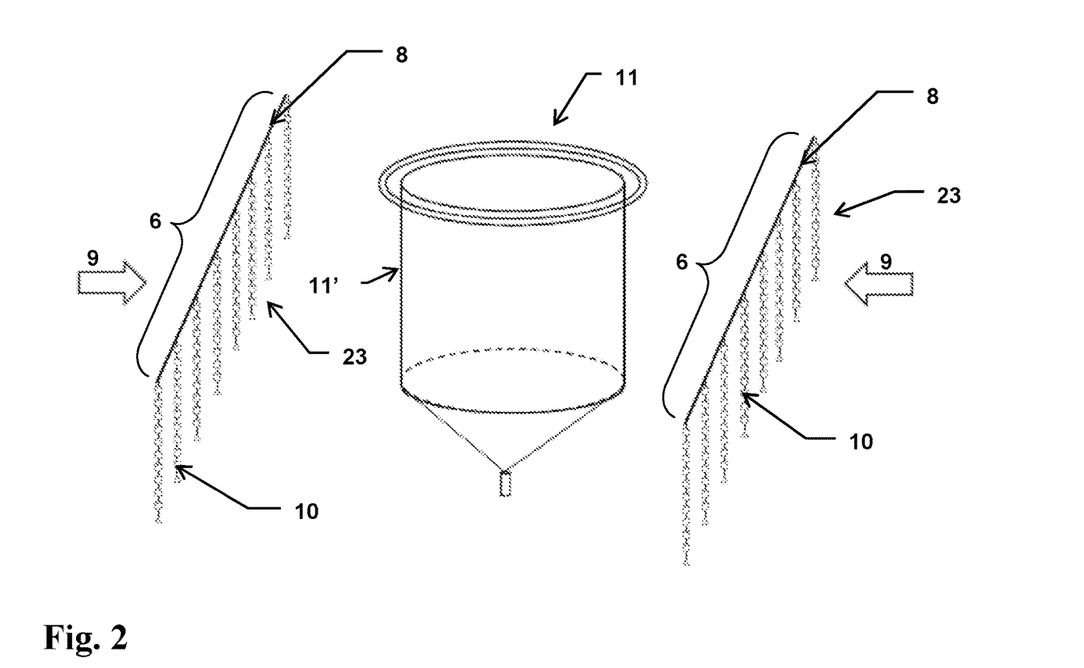

FIGS. 1 and 2 show a system made up of a plurality of devices 10, forming barriers 5, 6. Each barrier comprises a plurality of strings 23 of devices 10, suspended by and electrically interconnected by, respective cables 7. The strings 23 extend into the water 15 and surround or are placed on designated sides of a farming plant 11, having a net cage 11' for e.g. fish or other marine organisms. The cables 7 are illustrated at being suspended from the water surface, and may be furnished with weights (not shown). Each string 23 of devices 10 is connected to a common power and signal cable 8, which in turn may be connected to a power supply from a grid of from a solar power plant (not shown in FIGS. 1 and 2). Although not shown in the figures, it should be understood that the cable 8 is furnished with suitable buoyancy means, whereby the strings 23 may be arranged at the desired water depth, or they may be connected to the plant 11. Reference number 9 denotes water currents.

As a non-limiting illustration of a practical example, the plant 11 may have a net cage 11' with a diameter of approximately 160 meters, and each string 23 may comprise a quantity of 15 devices 10. Each string may have a length of approximately 15 meters. The common cable 8 may be arranged around and be connected to the outer perimeter of the net cage 11' and configured such that a total of 320 strings 23 are arranged around the net cage 11', 0.5 meters apart.

Figure 3:
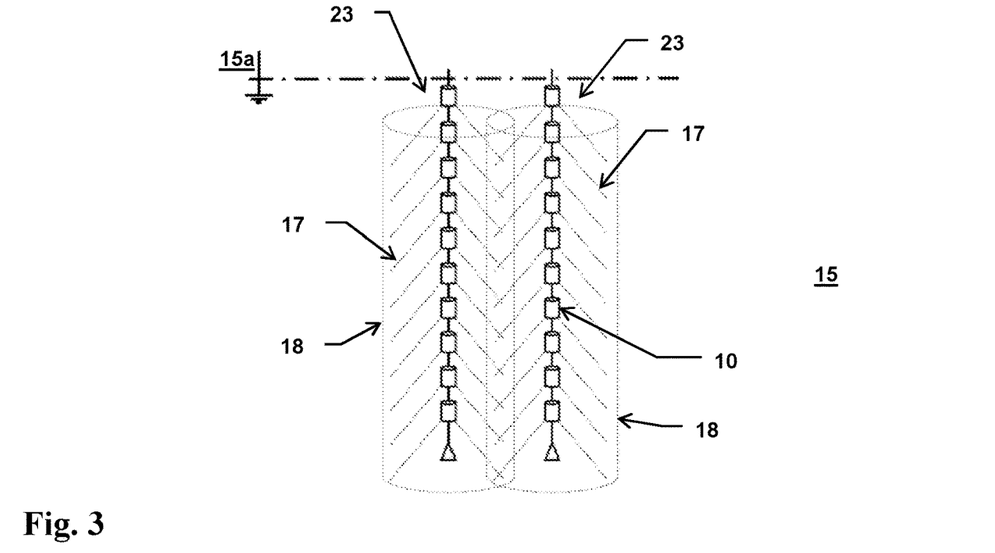
FIG. 3 is a sketch illustrating two chains of devices according to the invention, suspended in a body of water.

FIG. 3 shows two strings 23 of the device 10 hanging, one behind another, with an overlapping conical light angle downwards in the body of water 15. The light cones 17 overlap each other with cylindrical light columns 18 to attract salmon lice or parasites into the chlorine traps in the devices 10, as will be further explained below.

An embodiment of the device 10 according to the invention will now be described in more detail with reference to FIGS. 4a and 4b. In the illustrated embodiment, the device 10 comprises a body 12 having a cylindrical shape (other shapes are conceivable). The body 12 may comprise one or more cylindrically-shaped parts, which are assembled to or cast around the above mentioned cable 7. In FIG. 4, the cable 7 extends below the device 10 to be connected to a device (not shown) below. It should be understood that the invention is not limited to this cable configuration.

The body 12 forms a housing in which a plurality of lights 16 are arranged at an upper (i.e. inner) end of a cavity 20, in recesses 13 in a plate member 24 of an electrically conducting material (e.g. copper). It should be understood that the member 24 may have other shapes. The lights 16 are conveniently LED lights, and each light is arranged in its respective conical recess 13. The recesses 13 preferably have a conical surface shape in order to emit light at a conical angle and to form a pocket into which gas 21 may ascend and collect. The recess 13 openings are arranged such that the light preferably radiates down into the body of water at e.g. 90 degrees downwards from the body. The light beam scatter is indicated by the dotted lines. Reference number 17 identifies overlapping between the light beams from the devices hanging one after the other in the sea.

Figure 4A:
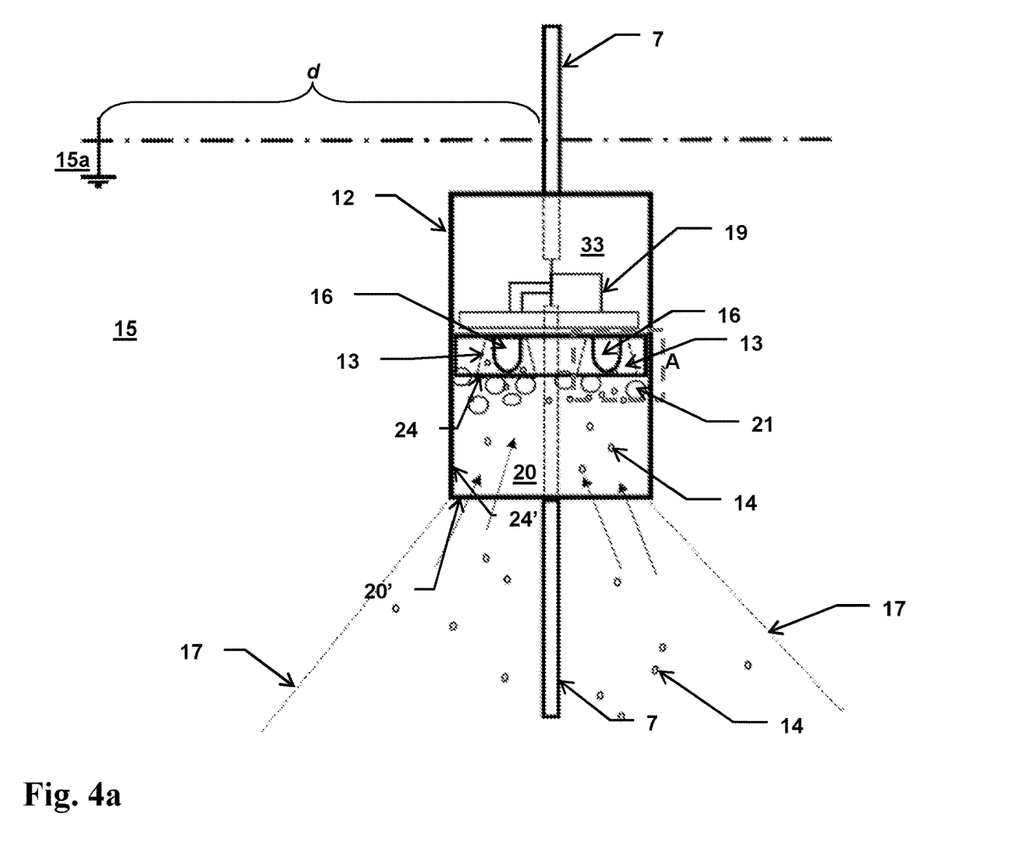
FIG. 4a is a sectional side view sketch of an embodiment of the device according to the invention.

Arranged above (as seen in FIG. 4a) the plate member 24 and recesses 13 is an electronics module 19, arranged in a compartment 33. The lower end of the body 12 comprises an opening 20' into the cavity 20. The plate member 24 and recesses 13 thus separate the cavity 20 (which is open to the surrounding seawater via opening 20') from the compartment 33 (which preferably but not necessarily is water tight). The inner wall 24' of the cavity 20 may also be clad with an electrically conductive material, and be electrically connected to the plate member 24. The body 12 may have an outer copper-clad surface to prevent fouling on the devices.

The electronics module 19 is powered by, and receives signals from, the cable 7, and supplies electrical power to the light sources 16. The electronics module 19 also receives (via the cable 7) a low-voltage (e.g. 1V, 5V, 12V, 24V), primary voltage from a direct current (DC) power source (not shown in FIGS. 4a,b). The positive pole is connected to the electrically conducting plate member 24 (connecting lead not shown), while the negative pole is connected to the seawater, indicated by reference number 15a in FIG. 4a. The negative pole (electrode) 15a may in principle be any electrically conductive metal object, such as a stainless steel chain (not shown) or similar. The fact that the devices use the sea water as common negative, will simplify the system and make it economically reasonable in production and in operation. The skilled person will be familiar with this concept for DC power transmission: wherein the seawater is used as one of the conductors. Therefore, the distance d between the positive electrode (i.e. the plate member 24) and the negative electrode 15a may be anything from a few centimeters to several tens of meters. The skilled person will know how to determine a suitable distance d, based on i.a. applicable plant design requirements and power levels.

When the electrically conductive member 24 (and optionally the clad inner wall 24') is subjected to a DC current, electrons travel from the negative electrode (the cathode) 15a, through the seawater (the electrolyte) and to the positive electrode (the anode) 24 (and 24'). As electrolysis in water is well known in the art, it need not be described in detail here. The skilled person will also understand that electrolysis is dependent on the water having a minimum salinity; and that the invention will be more effective in seawater than in, say, fresh water.

As is well known in the art, the electrolysis produces chlorine gas at the positive electrode 24, 24'. As the gas is more buoyant than the surrounding seawater 15 inside the cavity 20, the gas forms gas bubbles 21 that rise inside the cavity 20, towards the plate member 24 and light sources 16. As described above, chlorine gas dissolves in, and reacts with, the seawater to form hydrochloric acid and hypochlorous acid.

Figure 4B:
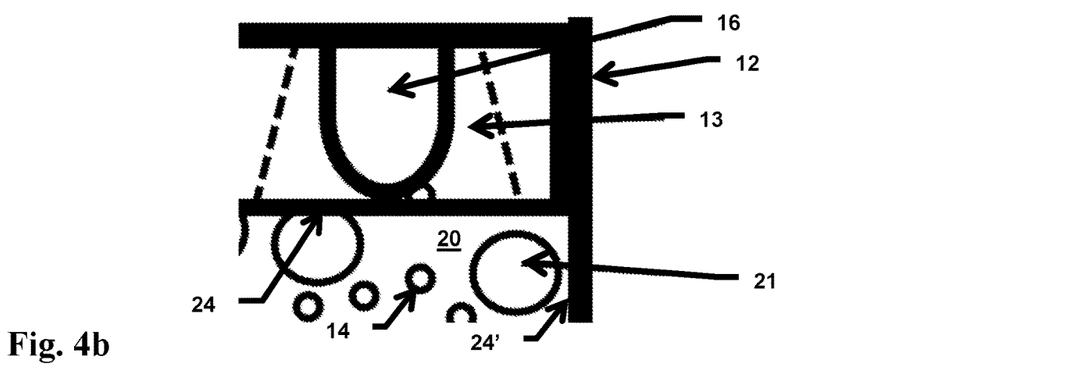

Meanwhile, parasites (e.g. salmon lice, etc.) in FIGS. 4a and 4b indicated with reference number 14, are attracted to the opening 20' beneath the body 12 and furthermore into the cavity 20 and towards the light sources 16. As mentioned above, copepodites/salmon lice are attracted to light with wavelengths of between 450 and 570 nm, whereby the light sources 16 may be configured to emit such wavelengths.

Figure 6:
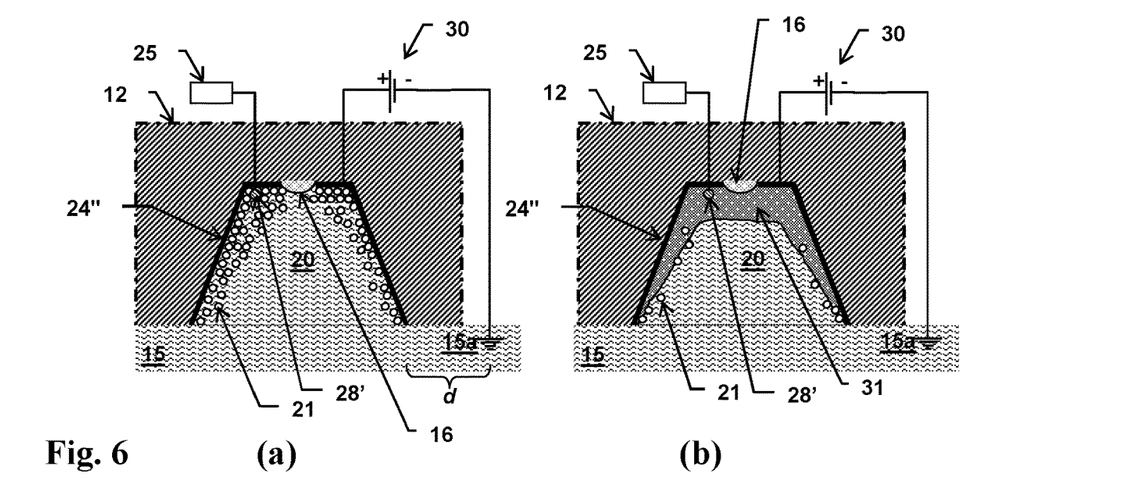
FIGS. 6a and 6b as principle sectional sketches of an internal cavity of an embodiment of the device according to the invention, illustrating gas and acid formation inside the device.

FIGS. 6a and 6b illustrate a fundamental embodiment and principle of the invention: A light source 16 is arranged at the upper end of a cavity 20 in a body 12. The cavity 20 is open to the surrounding seawater 15 below the body, as explained above. The inner wall 24" (or at least a portion) comprises an electrically conductive material (e.g. copper) or is at least partially clad with such material. An electrical power source 30 (e.g. a battery or similar supplying DC, or power from an AC source via a rectifier) supplies a low voltage as described above, where the electrically conductive material on the inner wall 24" constitutes the positive electrode (anode) and a lead 15a into the seawater constitutes the negative electrode (cathode). The distance d between the positive electrode 24" and the negative electrode 15a may be anything from a few centimeters to several tens of meters, as discussed above. For example, a system comprising a plurality of device strings 23 (cf. e.g. FIG. 1) may have one common negative electrode 15a in the seawater. As another example, each device body 12 may comprise an individual negative electrode 15a arranged on or next to an exterior surface of the body. Thus, in the first example, the distance d may be in the range of 20 to 50 meters, while d in the latter example may be approximately 5 to 10 centimeters. A set-up with a shorter distance d is less vulnerable to performance drops due to variations in seawater salinity. Also, having one or more negative electrodes extending deep into the body of water, e.g. to at least a depth corresponding to the length of a device string, will make the system more robust against variations in salinity through variouns layers in the seawater.

A sensor 28' is arranged inside the cavity and is connected to an external control system 25 (which may be arranged in the device or on a location above the body of water.

FIG. 6a illustrate how chlorine gas bubbles 21 form as a result of the electrolysis and rise towards the upper end of the cavity due to their inherent buoyancy. However, as discussed above, the chlorine gas is dissolved in, and reacts with, the seawater to form liquid acid which is toxic for animal plankton and parasites such as salmon lice. As the electrolysis and gas formation continues, a layer of liquid acid 31 will form inside the cavity 20, gradually covering the electrically conductive inner wall 24". This is illustrated by FIG. 6b. Formation of the acid layer 31 will gradually insulate the electrically conductive inner wall 24" (i.e. the anode) from the seawater, and thus effectively decrease and ultimately terminate the above mentioned electrolysis. However, the seawater 15 inside the cavity is in motion (due to e.g. water currents and movement of the body 12) and will tend to mix with and dilute the acid 31. When a sufficient amount of acid has been diluted and a portion of the electrically conductive inner wall 24" again is exposed to seawater, the electrolysis will resume produce gas 21. The formation of acid inside the cavity 20 is therefore self-controlled, and the skilled person will understand that the cavity shape and size (e.g. volume, opening size), extent of electrically conductive material inside the cavity, applied voltage level and periods, may be dimensioned so as to design a desires profile for generating the toxic acid 31. It also conceivable that the control system may be pre-programmed to apply the voltage for certain time periods, for example periods of five minutes every ten minutes.

The sensor 28' may also contribute relevant data for determining when and for how long a period voltage should be applied. The sensor 28' thus represents any conceivable sensor capable of providing relevant data pertaining to the environment inside the cavity 20 (e.g. relating to the gas generation and acid formation, water salinity, particle count temperature, density, etc.). Although not shown in FIGS. 6a and 6b, it should be understood (based on the description above with reference to FIGS. 4a and 4b) that parasites (e.g. salmon lice) are attracted by the light emitted by the light source 16 and will thus tend to accumulate in the region around the light source, where they are killed by the toxic acid 31.

Figure 7:
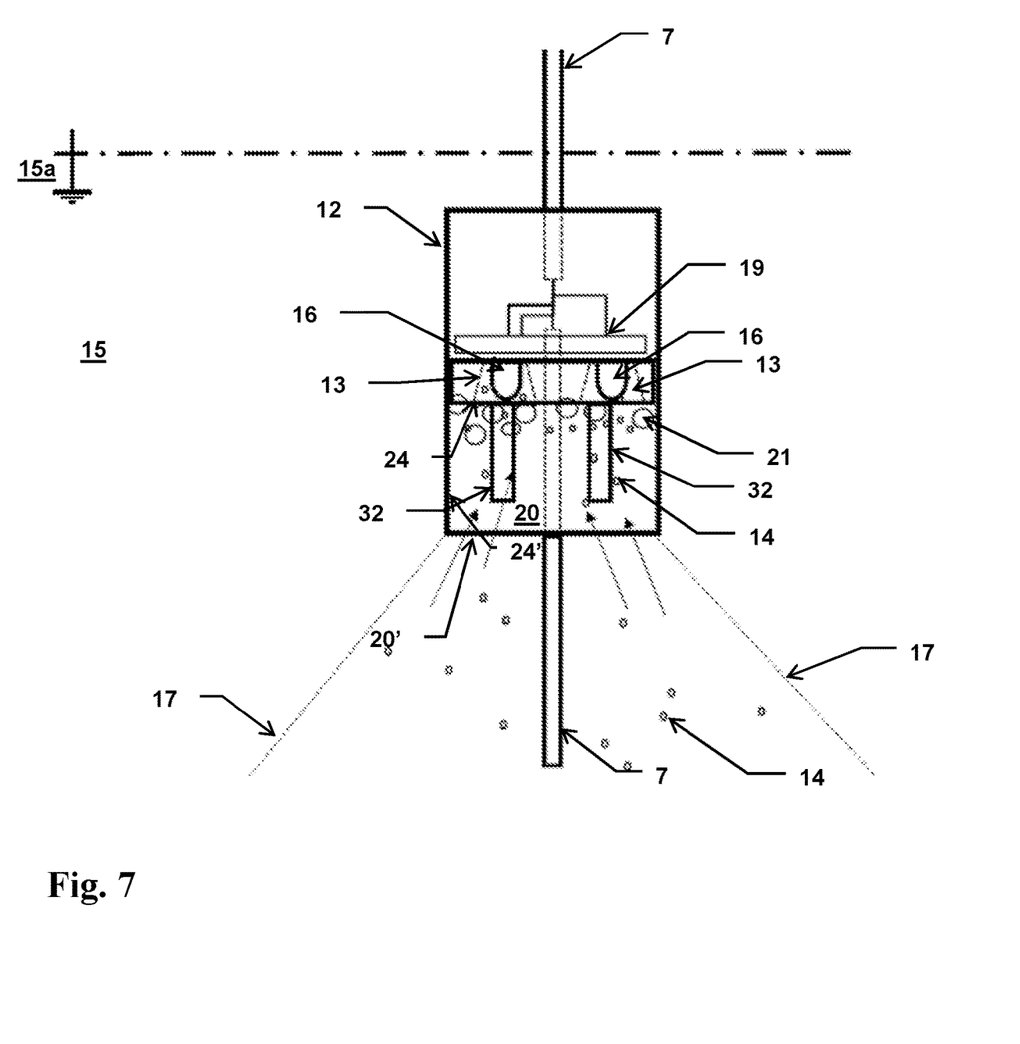
FIG. 7 is a sectional side view sketch of another embodiment of the device according to the invention.

Referring now to FIG. 7, the device illustrated in FIG. 4a may be modified to comprise one or more positive electrodes (anodes) 32 that may replace or come in addition to the electrically conductive plate member 24, and thus also be connected to the electronics module 19. These anodes 32, which extend a distance down into the cavity 20, are naturally also comprising an electrically conductive material, for example carbon or graphite. As the anodes 32 will be reduces (sacrificed) over time, they are replaceable.

Figure 8:
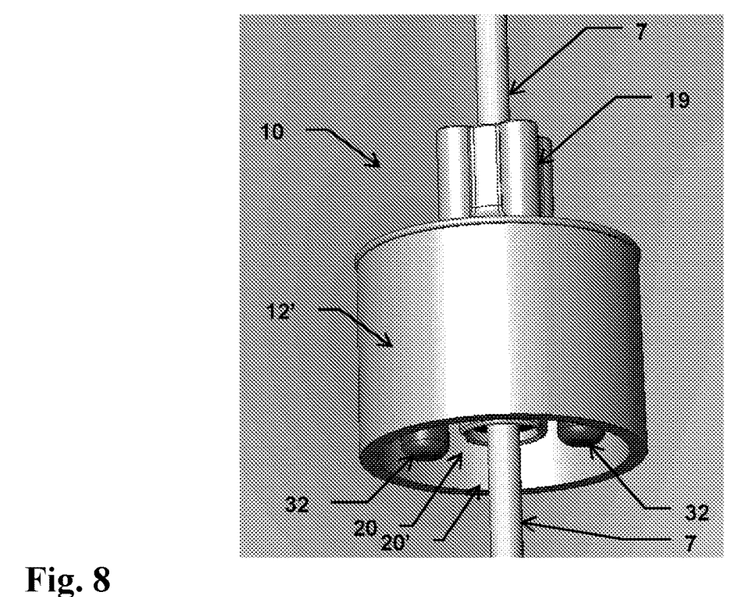
FIGS. 8 and 9 are perspective views of yet another embodiment of the device according to the invention.
Figure 9:
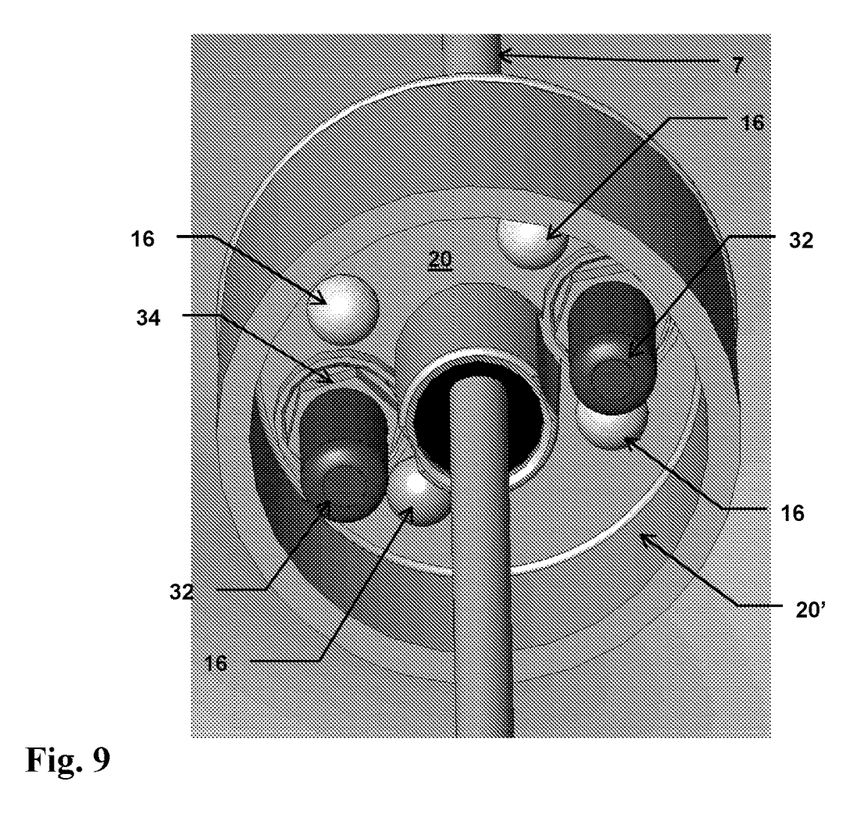
Figure 10:
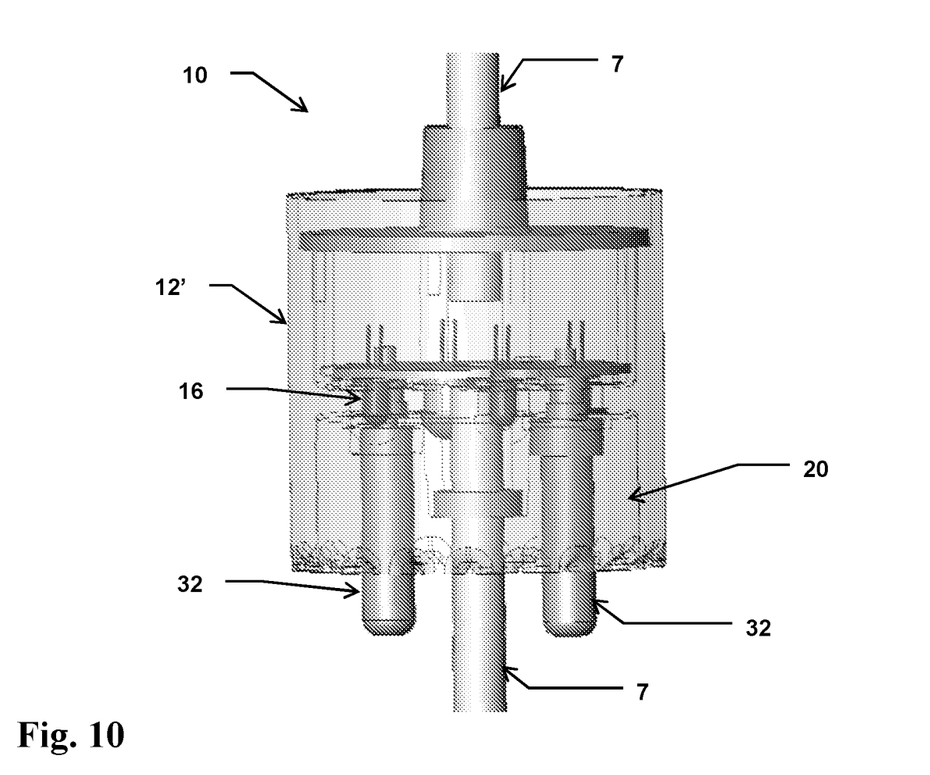
FIG. 10 is an x-ray side view of yet another embodiment of the device according to the invention.

FIGS. 8, 9 and 10 illustrate yet another embodiment of the device 10 according to the invention. In this embodiment, the electronics module 19 is placed on top of a cylindrical body 12', and connected to a power and control cable 7 as described above. The body 12 comprises an internal cavity 20, with a downward opening 20'. Arranged at the upper (inner) end of the cavity are lights 16, which may be powered and controlled as described above. FIGS. 8-10 show four lights 16, but the invention is not limited to this number.

Also arranged at the upper (inner) end of the cavity are anodes 32, which may be energized and controlled as described above. The anodes 32 extend downwards in the cavity 20. FIGS. 8-10 show two anodes 32, but the invention is not limited to this number. The anode comprises an electrically conductive material, such as copper, carbon, graphite, etc. Each anode 32 is connected to the housing by means of a threaded connection (not shown), whereby anodes may be replaced as they are being reduced in size (sacrificed) during the electrolysis process. The anode is secured to the threaded connection via a nut 34, whereby the anode may be removed and reinserted by means of e.g. a socket wrench. The length of each anode 32 may be determined based on overall design criteria (e.g. cavity size, power levels, number of anodes per device).

In use, the anodes 32 in the embodiment shown in FIGS. 8-10 will generate chlorine gas bubbles as a result of the electrolysis, as described above. The gas bubbles will rise towards the upper end of the cavity due to their inherent buoyancy. However, the chlorine gas will dissolve in, and react with, the seawater to form liquid acid, as described above with reference to FIG. 6a, 6b. Thus, as the electrolysis and gas formation continues, a layer of liquid acid will form inside the cavity 20, gradually covering the anodes 32. Formation of acid inside the cavity will gradually insulate the anodes 32 from the seawater, and thus effectively decrease and ultimately terminate the above mentioned electrolysis. However, the seawater inside the cavity will tend to mix with and dilute the acid, and when a sufficient amount of acid has been diluted and the anodes 32 again are exposed (at least partly) to seawater, the electrolysis will resume produce gas.

In general, the devices are harmless for fish and humans, as the primary voltage running the system is low voltage, and the current pulses have a character which is harmless for humans and fish, but with an amperage which kills animal plankton/salmon lice.

The devices may be controlled from the control system, such that the system may be remotely controlled with the object of turning off the current pulses in certain periods. This is to prevent other species, such as lobster larvae, from being attracted following hatching and then killed by the system.

It shall be noted that the system may also be used without the chlorine gas production, but only with light wavelengths to attract larger species of animal plankton at night that migrate pelagic and will feed on smaller species of animal plankton such as copepodites/salmon lice. This presents the system as an environmentally friendly solution as a catalyst for attracting organisms where the large eat the small. For example, krill eats copepodites, salmon lice, etc., and an ecosystem without any detrimental side effects on the environment may be made.

Figure 5:
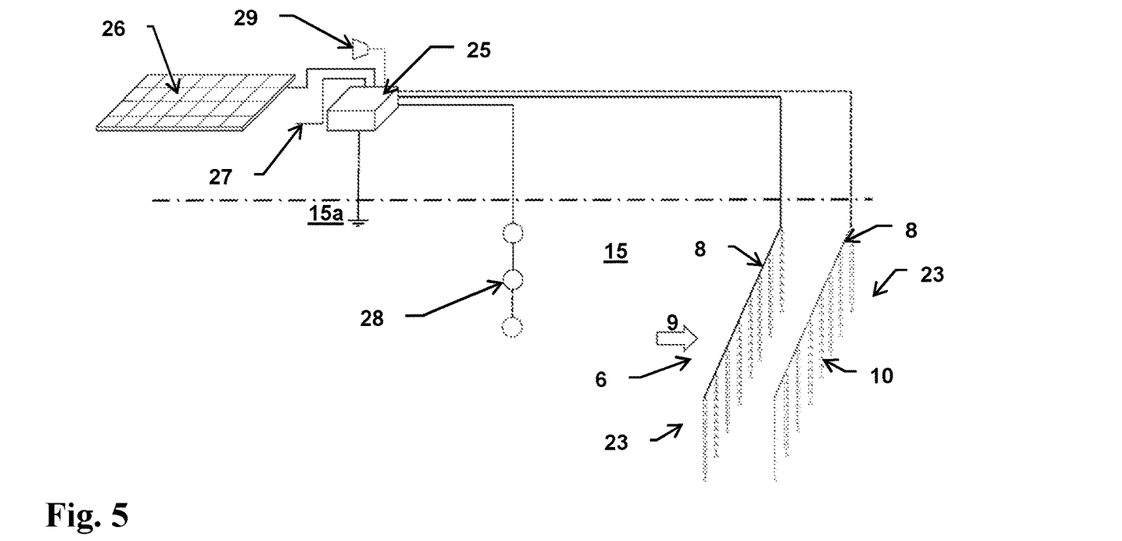
FIG. 5 is a principle sketch of an embodiment of the system according to the invention.

FIG. 5 shows a control system connected to the devices according to the invention.

As shown in FIG. 5, each or selected devices 10 may be connected to an external control system 25. For example, each submerged device 10 may be connected to the control system. The control system, or unit, 25 is preferably configured for monitoring and controlling light, production of chlorine/acid in the device 10, and may be arranged at a location above the body of water.

The control unit 25 (optionally in combination with the individual electronics modules 19) is configured to provide a pulsed power supply to the devices 10. The light sources 16 may be switched on and off intermittently (non-limiting example: 5 seconds on, 0.2 seconds off), and power to the electrodes may be interrupted at certain intervals (non-limiting example: 5 seconds on, 15 minutes off). Furthermore, power to the light sources and electrodes may be randomized between the individual devices, in order to reduce total power requirements for the entire system.

The control unit 25 is furthermore connected to a number of sensors 28 which are deployed in the water 15. Furthermore, the control unit 25 is connected to respective devices 10 via a common cable 8. The cable 8 may be connected to or attached to the cable 7 or it may be the same cable. The sensors 28 will be able to sense several parameters in the water, i.a. current/voltage, conductivity, temperature, water depth, light intensity, light scatter, and chlorine gas in or around the devices 10. Data from the sensors 28 may be stored and analyzed. An alarm 29 will be able to provide a warning of irregularities in the plant, when other events occur that require immediate attention.

The control system facilitates a surveillance of the system and the functions of the device.

What is claimed is:

1. A device for trapping and killing marine organisms such as animal plankton, salmon lice and other parasites, comprising:
   a body configured for submersion in water,
   at least one light source configured and controlled for attracting said marine organisms,
   a cavity arranged inside the body,
   an opening for fluid communication with at least a portion of the water,
   at least one positive electrode arranged in said cavity and configured for being electrically connected to a low-voltage power source, and
   at least one negative electrode arranged in the water and configured for being electrically connected to said power source,
   wherein:
   said at least one light source is arranged inside the cavity and arranged and controlled to emit light waves through said opening and into the at least a portion of the water;
   the at least one positive electrode is accessible through the opening in an operation state; and
   the device is operable to, by means of electrolysis with the water, generate chlorine gas at or in a region near the at least one positive electrode, and wherein the chlorine gas reacts with the water inside the cavity to form acid inside said cavity.

2. The device of claim 1, wherein
   the at least one positive electrode comprises an electrically conductive plate member or an electrically conductive material arranged on at least a portion of an inner wall of said cavity.

3. The device of claim 1, wherein the at least one positive electrode comprises one or more anodes connected to the body and extending into said cavity.

4. The device of claim 3, wherein at least one of the one or more anodes comprises a graphite material or a carbon material.

5. The device of claim 1, further comprising an electronics module for controlling and operating said at least one light source and said at least one positive electrode.

6. The device of claim 1, wherein
   said at least one light source comprises a light-emitting diode (LED) and said light waves are in a range between 450 and 570 nm.

7. The device of claim 1, further comprising a sensor arranged in said cavity and configured for sensing environmental parameters inside the cavity.

8. The device of claim 1, wherein the acid comprises at least hypochloric acid.

9. The device of claim 1, wherein the at least one negative electrode is arranged on or in a vicinity of the device.

10. An assembly for trapping and killing marine organisms such as animal plankton, salmon lice and other parasites, comprising a plurality of devices of claim 1 interconnected by a common power and control cable.

11. The assembly of claim 10, wherein
    said plurality of devices are arranged in a string, one device after another, and the cable extends through the plurality of devices.

12. A system for decimating marine organisms such as animal plankton, salmon lice and other parasites, comprising a plurality of devices of claim 1 suspended in the water to form a barrier of devices,
    wherein the plurality of devices are connected to a control system.

13. The system of claim 12, wherein the plurality of devices form at least one assembly comprising the plurality of devices interconnected by a common power and control cable.

14. The system of claim 12, further comprising at least one sensor arranged in the water in a vicinity of at least one of said plurality of devices and configured for sensing environmental parameters in the water.

15. The system of claim 12, wherein the plurality of devices are placed around a farming plant for farming fish or other marine animals.

16. The system of claim 12, wherein the plurality of devices are connected to an external control unit, configured for controlling and receiving signals from an electronics module in the body or on the body.

17. The system of claim 16, wherein the control unit is connected to a number of sensors for sensing of one or more of current/voltage, conductivity, temperature, depth, light measurement and water current, in or around the body.

18. The system of claim 16, wherein the control unit is connected to an alarm.

19. The system of claim 12, wherein the system comprises at least one of the low-voltage power source.

20. The system of claim 19, wherein the at least one of the low-voltage power source is a direct-current power source, or the control unit comprises conversion means for converting an alternating current to a direct current.

21. The system of claim 12, wherein the at least one negative electrode extending into the water.

22. A method of trapping and killing marine organisms such as animal plankton, salmon lice and other parasites using the device according to claim 1, the method comprising:
    a) submerging the at least one body in water;
    b) emitting light from inside the cavity and out into the water through the opening, said light having a wavelength suitable for attracting one or more of said marine organisms;
    c) forming the chlorine gas inside the cavity by electrolysis with the water inside the cavity, and allow said chlorine gas to react with the water inside the cavity to form at least hypochloric acid inside said cavity.

23. The method of claim 22, wherein the electrolysis is effected by application of the low-voltage current to the positive electrode inside said cavity.

24. The method of 22, further comprising, following step c), halting an application of the low-voltage current until a predetermined quantity of said acid has dissolved in the water.

25. The method of claim 22, wherein the at least hypochloric acid content inside said cavity is sensed by a sensor.

26. The method of claim 25, further comprising, following step c), halting an application of the low-voltage current until a predetermined quantity of said acid has dissolved in the water based on information provided by said sensor.

27. The method of claim 22 wherein the water is seawater.

28. The device of claim 1, wherein the at least one positive electrode is configured to be removable through the opening.

* * * * *